April 10, 1962 R. E. SKOW 3,029,068
HEAT EXCHANGER FOR DISTILLING DEVICES
Filed Nov. 3, 1955
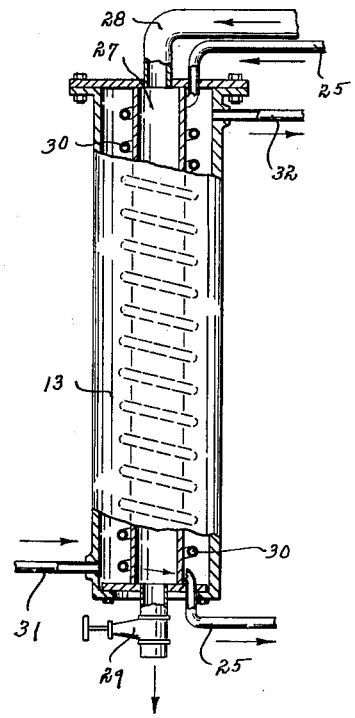
Witness.
A. S. Martin
INVENTOR.
ROSS E. SKOW
BY
M. Talbert Dick
ATTORNEY

United States Patent Office 3,029,068
Patented Apr. 10, 1962

3,029,068
HEAT EXCHANGER FOR DISTILLING DEVICES
Ross E. Skow, Kansas City, Mo., assignor to Hydro Engineering Corporation, Miami, Fla., a corporation of Florida
Filed Nov. 3, 1955, Ser. No. 544,754
1 Claim. (Cl. 257—241)

This invention relates to a heat exchanger used in devices for purifying water.

Devices for distilling water and other liquid having high or low volatility are old. Heretofore, however, the cost has been excessive for producing pure distilled water for volume usages. This is especially true in attempts to produce pure water from ocean salt water for human, animal, and land irrigation purposes. My heat exchanger is used in conjunction with a pure water processing plant having an evaporator, pure water outlet pipe, a pollution exhaust pipe and a raw water supply pipe.

Therefore, the principal object of my invention is to provide a heat exchanger for use in distilling devices that due to its installation in the system makes possible the production of pure water at a relatively low cost.

A further object of the present invention is to provide an apparatus for use in purifying water which may be embodied in any sized system ranging from a small compact unit for household purposes or to as large a system as would be necessary to provide pure water for an entire city.

More specifically, the object of this invention is to provide a heat exchanger that transfers useful heat units from both the distillate and waste matter to the incoming liquid to be processed.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawing, in which the drawing shows a side sectional view of my heat exchanger.

The distillate or pure hot water passing through the pipe conduit 25 from a distilling device has valuable heat units and the purpose of the heat exchanger, obviously, is to transfer them to the incoming liquid to be processed, thereby saving considerable additional heat in reducing the impure liquid to vapor. The heat exchanger 13 is a tubular enclosed tank having a longitudinal pipe 27 extending through its center bore as shown in the drawing. A conduit 28 communicates with approximately the normal water line in the evaporator of a distilling unit and the top of this pipe 27. The lower end of the pipe 27 has a hand valve 29. The numeral 30 designates a tube coiled around the pipe 27 and inside the heat exchanger shell. This tube is imposed in the hot condensate pipe 25. The numeral 31 designates the raw water supply pipe adapted to be in communication with a source of raw impure water and emptying into the inside bottom of the heat exchanger. The numeral 32 designates a pipe leading from the inside top of the heat exchanger to the inside of the evaporator of a distilling device. I find that in purifying salt water, the most economical and efficient method is to obtain approximately two thirds pure water therefrom and to discard one third. The third discarded, obviously, is seriously polluted and I find that the point of concentration is at approximately the normal water line in the boiler of a distilling device. This concentrate will be in the form of material laden liquid, froth, foam and like. By opening the valve 29, this discarded matter will pass from the device to the sewer or like. However, as it leaves the boiler of the distilling device it will be almost at boiling temperatures. By passing this waste material through the pipe 27, much of its useful heat units will be transferred to the raw liquid entering the process. Likewise, the condensed pure liquid will have valuable heat units and as shown in the drawing this distillate is also passed through the heat exchanger. Thus, all heated matter, both pure and contaminated, will give up most of its heat units to the incoming raw water.

Some changes may be made in the construction and arrangement of my heat exchanger for distilling devices without departing from the real spirit and purpose of my invention, and it is my intention to cover by my claim, any modified forms of structure or use of mechanical equivalents which may be reasonably included within their scope.

I claim:

In a heat exchanger for use with a pure water processing plant having an evaporator, a pure water outlet pipe, a pollution exhaust pipe, and a raw water supply pipe, a tank housing into which the raw water supply pipe discharges, a pipe extending through said tank housing and having one of its ends connected to the pollution exhaust pipe, and a tubular pipe extending through said tank housing and imposed in said pure water outlet pipe and spiraled around said pipe that extends through said tank.

References Cited in the file of this patent

UNITED STATES PATENTS

| | | |
|---|---|---|
| 838,195 | Le Sueur | Dec. 11, 1906 |
| 2,280,093 | Kleinschmidt | Apr. 21, 1942 |
| 2,379,519 | Hall | July 3, 1945 |
| 2,619,453 | Andersen | Nov. 25, 1952 |